July 5, 1927.
C. G. MINER
1,634,796
PROCESS OF CONTINUOUSLY PRODUCING PHOSPHORUS NITRIDE AND
CERTAIN HALIDES FROM RAW MATERIALS
Filed July 25, 1925
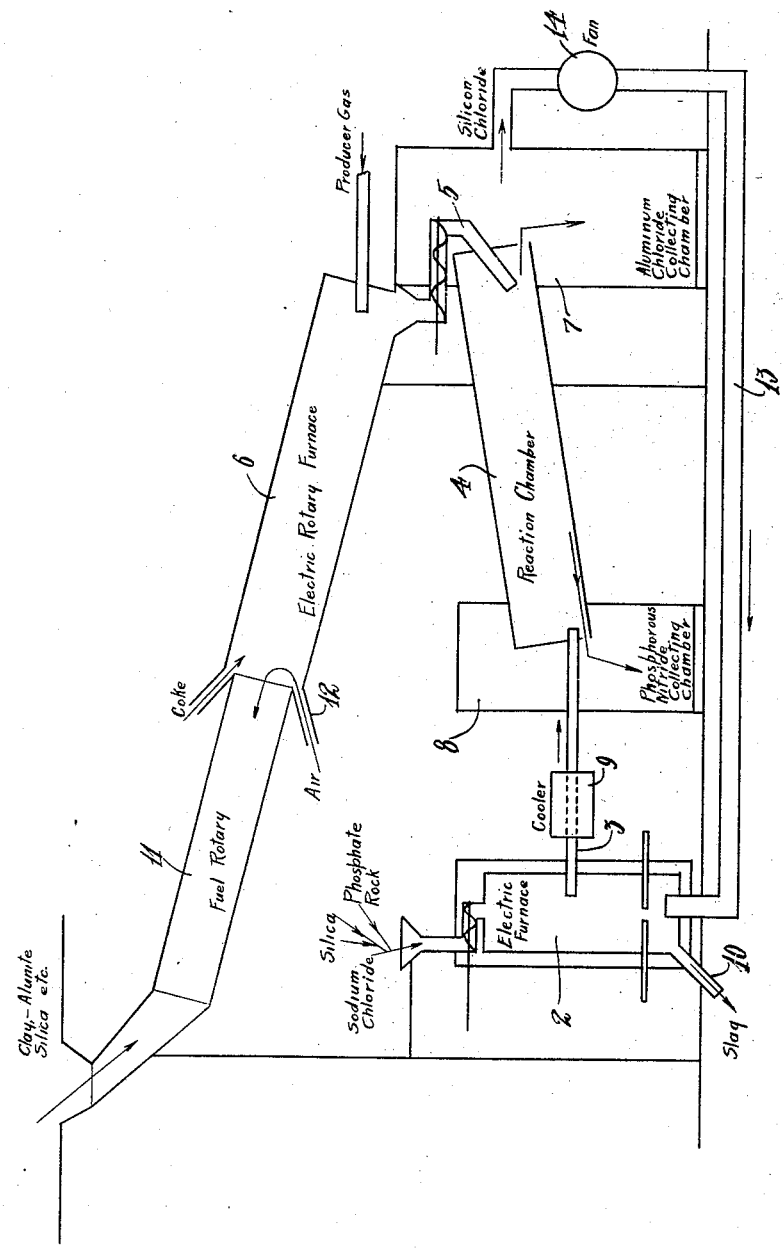
Inventor
Claude G. Miner
By Lyon Lyon
Attorneys Patented July 5, 1927.

1,634,796

UNITED STATES PATENT OFFICE.

CLAUDE G. MINER, OF BERKELEY, CALIFORNIA.

PROCESS OF CONTINUOUSLY PRODUCING PHOSPHORUS NITRIDE AND CERTAIN HALIDES FROM RAW MATERIALS.

Application filed July 25, 1925. Serial No. 46,115.

This invention relates to the economical production in commercial quantities of phosphorus nitride and certain halides from raw materials by a continuous process.

Phosphorus nitride has been long known scientifically and theoretically but no method has heretofore existed whereby it could be produced practically in commercial quantities. Certain halides constitute valuable and useful agents, but their production by prior methods has been too costly for their general use. For example anhydrous aluminum chloride is a valuable metathesis agent in the production of organic compounds, is a valuable agent for cracking hydrocarbon oils and is valuable as a source of aluminum. The production of aluminum chloride directly from its elements or raw material by prior methods has been too costly to permit the general use of aluminum chloride for oil cracking or as a source of aluminum.

I have discovered that under proper conditions a phosphorus halide and certain nitrides may be caused to react to produce phosphorus nitride and desirable halides of the above mentioned character. To obtain the full commercial advantage of this discovery it is my object to provide a process whereby I can start with raw materials and proceed to economically produce commercial quantities of phosphorus nitride and the halide or halides desired.

My invention contemplates first producing from suitable materials the phosphorus halide to be caused to react with the initial nitride for the production of phosphorus nitride and the desired halide. Upon the production of the phosphorus halide it is caused to react under suitable conditions with the initial nitride and the phosphorus nitride and halide so produced are separated. The initial nitride so employed may be produced concurrently with the production of the phosphorus halide if desired and the entire process may proceed continuously.

Various advantages of my invention will appear from the following disclosure wherein I have set forth for illustration certain specific examples embodying my invention. In connection with the disclosure reference is made to the accompanying drawing in which there is diagrammatically illustrated apparatus which may be employed in performing the operations described.

*Example A.*—4.75 tons of phosphate rock, preferably 68 per cent tricalcium phosphate or over, is crushed and ground to about 20 mesh and introduced into a suitably lined electric furnace 2. Six tons of sodium chloride are also introduced into the furnace 2 and the mixture therein heated to a temperature of approximately 1100° to 1400° C. Phosphorus pentachloride and calcium and sodium oxides are formed in the furnace 2, the phosphorus pentachloride distilling off through the line 3 and passing into a reaction chamber 4. The phosphorus pentachloride passes upward in the reaction chamber 4 counter-current to aluminum nitride introduced at 5. A suitable temperature is maintained in the reaction chamber 4 and an exothermic reaction takes place therein between the phosphorus pentachloride and the aluminum nitride whereby aluminum chloride and phosphorus nitride are formed as follows:

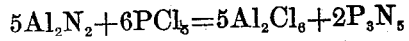

$$5Al_2N_2 + 6PCl_5 = 5Al_2Cl_6 + 2P_3N_5$$

Preferably the aluminum nitride employed in this reaction is produced from raw material concurrently with the production of the phosphorus pentachloride. For that purpose 2.1 tons of alunite residue, preferably about 76 per cent alumina, or 3.2 tons of bauxite, preferably about 50 per cent alumina, is mixed with 1.2 tons of 85 per cent coke and heated in an electric (rotary) furnace 6, to a temperature of approximately 1700 to 1900° C. 15 to 25 per cent hydrocarbon with or without free hydrogen, may be added to the mixture in the furnace 6 and will enable the reaction temperature to be lowered to approximately 1500° C. An atmosphere of nitrogen or producer gas rich in nitrogen is maintained in the furnace 6. Aluminum nitride is produced in the furnace 6 and directly upon its formation may be introduced at 5 into the reaction chamber 4.

Aluminum chloride produced in the reaction chamber 4 volatilizes at a relatively low temperature of 183° C., whereas the phosphorus nitride is not decomposed at a temperature below 800° to 900° C. The aluminum chloride produced in the reaction chamber 4 therefore volatilizes and separates from the phosphorus nitride which remains as a solid. The aluminum chloride may be condensed and collected in a suitable chamber 7 and the phosphorus nitride collected in a suitable chamber 8. Heat will be liberated by the exothermic reaction in the chamber 4 to maintain a temperature of approximately 560° C. and the reaction will proceed of itself upon an initial temperature of from 200° to 500° C. If this temperature should rise too high, the reaction chamber may be constructed in the form of a heat exchanger and use made of the surplus heat to heat the furnaces 2 or 6, or used elsewhere as desired. A cooler 9 may be interposed between the furnace 2 and reaction chamber 4 to reduce the temperature of the phosphorus pentachloride passing from the furnace 2 in the event its temperature be such that it will too greatly enhance the temperature in the reaction chamber 4. A suitable cooler may be employed for like purpose if required to suitably cool the nitride entering the reaction chamber 4. The quantities of raw materials here stated should yield 4½ tons of aluminum chloride in the chamber 7 and 1 ton of phosphorus nitride in the chamber 8.

The amount of thermal energy required in the process largely determines its practicability and my invention provides a process whose thermal energy cost may be kept within practical commercial limits. My invention enables the phosphorus chloride and the initial nitride produced from the raw materials to be contacted while retaining sufficient heat from their temperature of production to permit the reaction between the phosphorus chloride and aluminum nitride to proceed exothermically. The phosphorus nitride and aluminum chloride are therefore formed without requiring the furnishing of more thermal energy than is required for the formation of the intermediate phosphorus chloride and initial nitride. In some instances I have found that the exothermic heat of the reaction between the phosphorus chloride and nitride employed is greater than is required or desired in that reaction and heat may be taken from that reaction and employed as a source of thermal energy for the production of the phosphorus chloride and initial nitride or be otherwise used.

*Example B.*—13.5 tons of phosphorus rock, preferably about 70 per cent tricalcium phosphate, 5.3 tons of silica, and 6 tons of sodium chloride, are fed into the furnace 2 and heated at a temperature of approximately 1100° to 1400° C. Phosphorus pentachloride is formed and passes as a gas through the line 3 to the reaction chamber 4, having been first partially cooled at 9 if desired. There remains in the furnace 2 a calcium sodium silicate slag which may be drawn off continuously or at suitable intervals through the outlet 10. In the reaction chamber 4 the ascending phosphorus chloride vapors meet nitrides of aluminum and silicon descending counter-current and an exothermic reaction takes place whereby phosphorus nitride and chlorides of silicon and aluminum are formed as follows:

$$5Al_2N_2 \cdot 5Si_3N_4 + 18PCl_5 = 5Al_2Cl_6 + 15SiCl_4 + 6P_3N_5$$

The nitrides of aluminum and silicon employed in this reaction may be produced in the furnace 6 concurrently with the production of the phosphorus chloride in the furnace 2. For that purpose 5 tons of high grade clay, preferably about 35 per cent alumina, are preheated in a rotary kiln 11 and are introduced into the furnace 6 together with 3 tons of coke, about 85 per cent carbon. The coke and clay having been previously comminuted to about 80 mesh are maintained in the furnace 6 at a temperature of approximately 1700° to 1900° C. in the absence of hydrocarbon, 15 to 25 per cent of which may be added to the mixture to enable the reaction temperature to be lowered to approximately 1500° C. An atmosphere of nitrogen or producer gas, rich in nitrogen, is maintained in the furnace 6. Air is admitted to the furnace 6 at 12 for combustion with the carbon monoxide produced during the reaction in the furnace 6 and the heat provided by this combustion may be employed to preheat the clay thereby affecting a considerable economy of thermal energy. Nitrides of aluminum and silicon are formed by the reaction in the furnace 6 and are introduced at 5 into the reaction chamber 4, having been first partially cooled if desired.

The aluminum and silicon chlorides produced by the reaction in the chamber 2 above set forth, volatilize at 183° C. and 60° C. respectively, and pass over into the chamber 5, the phosphorus nitride gravitating down into the chamber 8. The chamber 7 may be maintained at a temperature of approximately 100° C. to 140° C., thereby condensing substantially all of the aluminum chloride and separating it from the silicon chloride which remains volatilized at that temperature. Silicon chloride so formed may, in whole or in part, be recirculated by the fan 14 back through the line 13 to the furnace 2 there to participate in the reaction by which the phosphorus chloride is formed, approximately in accordance with the following reaction:

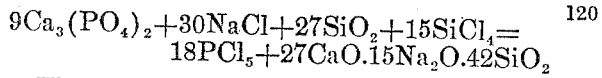
$$9Ca_3(PO_4)_2 + 30NaCl + 27SiO_2 + 15SiCl_4 = 18PCl_5 + 27CaO \cdot 15Na_2O \cdot 42SiO_2$$

The return of the silicon chloride to the furnace 2 reduces the amount of sodium chloride required and also reduces the thermal energy that is necessitated for the reaction by which the phosphorus chloride is formed.

In the example given above, the quantities of raw materials stated for this example should yield 4½ tons of aluminum chloride, 8½ tons of silicon chloride, and 2.9 tons of phosphorus nitride.

It will be apparent that my invention is not limited to the uses illustrated in the foregoing examples. The production and use of phosphorus halides other than phosphorus chloride is contemplated and nitrides other than aluminum and silicon may be produced and used whose halides have volatilizing temperatures sufficiently below the decomposition temperatures of phosphorus nitride to permit the reaction products to be formed and separated. The terms "alkaline", "halide" and "alkaline chloride" employed herein are intended to include the halides and chlorides respectively of both alkali metals (sodium, potassium and lithium) and alkaline earth metals (calcium, strontium and barium) any of which may be used in producing the phosphorus halide from the phosphate rock. The invention is capable of being put to a wide variety of uses under widely varying conditions and I do not intend to limit the same to the above disclosure except as may be required by the following claims.

I claim:

1. The process of producing phosphorus nitride which comprises forming volatile phosphorus chloride and contacting the volatile chloride as formed with a nitride of a metallic element at a temperature between 183° C. and 560° C.

2. The process of producing phosphorus nitride which comprises heating phosphate rock with a chloride of an alkali-forming metal in a furnace to form volatile phosphorus chloride and passing the volatile phosphorus chloride from the furnace into contact with a nitride of a metallic element to cause the same to react together at a temperature between 183° C. and 560° C.

3. The process of producing phosphorus nitride which comprises producing phosphorus chloride from phosphate rock and a chloride of an alkali-forming metal, reducing the temperature of the phosphorus chloride so formed, and causing the same to react with a nitride of a metallic element at a temperature between 183° C. and 560° C.

4. The process of producing phosphorus nitride which comprises forming phosphorus chloride from phosphate rock and a halide of an alkali-forming metal, reducing the temperature of the phosphorus halide so formed and passing the same into contact with a nitride of a metallic element at a temperature at which the phosphorus halide will react with the nitride to produce a volatile halide and phosphorus nitride.

5. A process of producing phosphorus nitride which comprises heating together phosphorus rock and a chloride of an alkali-forming metal to produce phosphorus chloride, causing the phosphorus chloride as formed to react at a temperature between 183° C. and 560° C. with silicon nitride to produce phosphorus nitride and silicon chloride and returning silicon chloride so formed to participate with the phosphorus rock and chloride of an alkali-forming metal in the reaction by which the phosphorus chloride is formed.

6. A process of producing phosphorus chloride and certain desirable halides which comprises heating together phosphate rock and a chloride of an alkali-forming metal to produce phosphorus chloride, and causing the phosphorus chloride to react at a temperature between 183° C. and 560° C. with nitrides of aluminum and silicon to produce phosphorus nitride and volatile chlorides of aluminum and silicon and separating the aluminum and silicon chlorides.

7. A process of producing phosphorus nitride and certain desirable halides which comprises heating together phosphate rock and a chloride of an alkali-forming metal to produce phosphorus chloride, causing the phosphorus chloride to react at a temperature between 183° C. and 560° C. with nitrides of aluminum and silicon to produce phosphorus nitride and volatile chlorides of aluminum and silicon, separating the aluminum and silicon chlorides and returning the silicon chlorides so formed to participate with the phosphorus rock and chloride of an alkali-forming metal in the reaction by which the phosphorus chloride is formed.

8. The process of producing phosphorus nitride and halides of aluminum and silicon, which comprises causing a phosphorus halide and nitrides of aluminum and silicon to react together at a temperature between 183° C. and 560° C.

Signed at San Francisco, Calif., this 10th day of July, 1925.

CLAUDE G. MINER.